United States Patent
Choi et al.

(10) Patent No.: US 9,640,047 B2
(45) Date of Patent: May 2, 2017

(54) METHOD AND APPARATUS FOR GENERATING HAPTIC SIGNAL WITH AUDITORY SALIENCY ESTIMATION

(71) Applicant: POSTECH ACADEMY—INDUSTRY FOUNDATION, Gyeongsangbuk-do (KR)

(72) Inventors: Seung Moon Choi, Gyeongsangbuk-do (CN); In Wook Hwang, Daejeon (KR)

(73) Assignee: POSTECH ACADEMY-INDUSTRY FOUNDATION, Pohang-si, Gyeongsangbuk-do (KR)

( * ) Notice: Subject to any disclaimer, the term of this patent is extended or adjusted under 35 U.S.C. 154(b) by 25 days.

(21) Appl. No.: 14/808,311

(22) Filed: Jul. 24, 2015

(65) Prior Publication Data
US 2016/0027264 A1    Jan. 28, 2016

(30) Foreign Application Priority Data
Jul. 25, 2014   (KR) .................. 10-2014-0094690

(51) Int. Cl.
*G08B 21/00*  (2006.01)
*G08B 6/00*   (2006.01)
*G06F 3/01*   (2006.01)

(52) U.S. Cl.
CPC .............. *G08B 6/00* (2013.01); *G06F 3/016* (2013.01)

(58) Field of Classification Search
CPC .................................. G06F 3/016; G08B 6/00
USPC ........................................................ 340/407.1
See application file for complete search history.

(56) References Cited

U.S. PATENT DOCUMENTS

| | | | |
|---|---|---|---|
| 2003/0067440 A1* | 4/2003 | Rank ....................... | G06F 3/016 345/156 |
| 2005/0149339 A1* | 7/2005 | Tanaka .................. | G10L 21/038 704/500 |
| 2007/0236449 A1* | 10/2007 | Lacroix ................... | G06F 3/016 345/156 |
| 2011/0128132 A1 | 6/2011 | Ullrich et al. | |
| 2012/0224719 A1* | 9/2012 | Johansson ................ | G08B 7/06 381/98 |

FOREIGN PATENT DOCUMENTS

| KR | 1020120126446 A | 11/2012 |
|---|---|---|
| KR | 1020140079582 A | 6/2014 |

* cited by examiner

*Primary Examiner* — Mark Rushing
(74) *Attorney, Agent, or Firm* — Ladas & Parry LLP

(57) ABSTRACT

A method and apparatus for generating a haptic signal with auditory saliency estimation from an audio signal is disclosed. The method includes detecting audio characteristic information of a bass component and audio characteristic information of a treble component from a received audio signal, estimating auditory saliency with respect to the audio signal based on the two types of audio characteristic information, and calculating a tactile signal based on the auditory saliency.

18 Claims, 4 Drawing Sheets

METHOD AND APPARATUS FOR GENERATING HAPTIC SIGNAL WITH AUDITORY SALIENCY ESTIMATION

CLAIM FOR PRIORITY

This application claims priority to Korean Patent Application No. 2014-0094690 filed on Jul. 25, 2014 in the Korean Intellectual Property Office (KIPO), the entire contents of which are hereby incorporated by reference.

BACKGROUND

1. Technical Field

Example embodiments of the inventive concept relate in general to technology of generating a tactile signal using an audio signal, and more specifically, to method and an apparatus for generating haptic signals using a part to be noted in the characteristics such as a frequency and an intensity of an audio signal.

2. Related Art

A haptic stimulus that capable of sensing when a finger of a man touches an object has a tactile feedback and a kinesthetic. The tactile feedback is sensed when an object is touched to a surface of a skin and the kinesthetic force feedback is sensed when movements of a joint and a muscle are obstructed.

These haptic feedbacks are mostly and firstly used in a medical field. Due to characteristics of the medical field, particularly, an invasive surgery field, since it is difficult to endure a training process through trial and error and a high cost is required, the haptic feedbacks which are a relatively economical tool have been used.

For example, a three-dimensional image capable of directly operating an affected area of a virtual patient while watching a three-dimensional anatomical structure displayed on a computer screen is displayed on the computer screen in real time. And also, a tactile which is likely to touch an actual skin tissue using a mechanical receptor such as a small pin which is movable by compressed air or electricity, etc. is transferred, and an environment which is almost similar to an actual situation is implemented.

This haptic stimulus is differently recognized according to a speed and a force rubbing an object, and a physical property of the object. Accordingly, if the same man desires to recognize different haptic stimuli, the physical property of the object should be changed. For this, proposed is technology of providing various haptic stimuli to a user by forming a plurality of fine protrusions on a contact surface on which a hand is touched, changing the lengths of the plurality of fine protrusions and intervals between the plurality of fine protrusions, and adjusting a displacement and a frequency of vibrations of the fine protrusions.

Meanwhile, there has been a trial for playing a sound three-dimensionally by combining the haptic stimuli also in an audio field. It is used that terminology referred to as a fourth dimension evolved from a third dimension, and this is a marketing terminology unlike second dimension and the third dimension. When transferring the sound, for example, it may be understood that a tactile signal involved in the sound is included in the fourth dimension in this specification.

Recently, the haptic technology has been attracting attention as a method of transmitting information to various multimedia contents such as a game, a movie, a music, etc. using a tactile, and products such as a vibration earphone and a headphone, a home theater system, a four dimensional theater, a tangible game console, a smart phone and a tablet PC have been released. These products are increasing immersion and satisfaction of the user as a multisensory display device using not only visual and auditory senses but also a tactile sense in user experience of the multimedia contents.

In order to transfer touch information, currently, a method in which the man directly makes a signal through an operation such as a composition or which uses as a vibration signal by filtering a low frequency component of an audio signal is mostly used. However, the method in which the man directly makes the tactile signal has a disadvantage in which many time and a high cost are required, and the method which uses the low frequency component of the audio signal naturally does not naturally harmonize with the audio signal compared with the method in which the man directly makes the tactile signal. Studies on a method of genefating the tactile signal which is naturally harmonized with the audio signal without consuming many time and the high cost are required.

SUMMARY

Accordingly, example embodiments of the inventive concept are provided to a method and apparatus for generating a tactile signal based on an audio signal by improving a conventional method of generating tactile effects based on an audio signal in which many time and a high cost are required or which does not suitably harmonize with the audio signal. The tactile signal which is suitable for an auditory stimulus receiving from an audio signal automatically and rapidly is transmitted to a user.

In some example embodiments, a method of generating a haptic signal with auditory saliency estimation from an audio signal, includes calculating audio characteristics information from a received audio signal, calculating auditory saliency according to the audio characteristics information based on an auditory saliency weight, and calculating a tactile signal based on the auditory saliency.

Here, the audio characteristics information may include at least one among an intensity, a pitch, a rhythm, an energy, a temporal contrast, a melody, a harmony, and a timbre, of the received audio signal.

Here, the calculating of the audio characteristics information may divide a frequency band of the received audio signal into a predetermined unit, and calculate the audio characteristics for each sub frequency band.

Further, the calculating of the auditory saliency may calculate the auditory saliency based on the audio characteristics for each sub frequency band.

Here, the auditory saliency weight may be predetermined or be calculated from the audio characteristics information.

Here, the tactile signal may be generated by converting a frequency of the received audio signal, or be generated as a reference vibration frequency corresponding to each sub frequency band in which the frequency band of the received audio signal is divided into the predetermine unit.

Further, the tactile signal may be generated as the reference vibration frequency by determining an amplitude according to the auditory saliency.

Here, the calculating of the tactile signal may determine a pattern of a haptic stimulus based on the auditory saliency and a sound source configuring the received audio signal.

Here, the audio signal may be generated from an element of an operating system controlling an audio driver.

Here, the method of generating the haptic signal, after the calculating of the tactile signal, may further include generating the haptic stimulus by transmitting the tactile signal to an apparatus for generating the haptic stimulus.

In other example embodiments, an apparatus for generating a haptic signal with auditory saliency estimation from an audio signal, includes an audio signal receiver configured to receive an audio signal, an auditory characteristics information calculator configured to calculate audio characteristics information from the received audio signal; an auditory saliency calculator configured to calculate auditory saliency according to the audio characteristics information based on an auditory saliency weight, and a tactile signal calculator configured to calculate a tactile signal based on the auditory saliency.

Here, the audio characteristics information may include at least one among an intensity, a pitch, a rhythm, an energy, a temporal contrast, a melody, a harmony, and a timbre, of the received audio signal.

Here, the audio characteristics information calculator may divide a frequency band of the received audio signal into a predetermined unit, and calculate the audio characteristics for each sub frequency band.

Further, the auditory saliency calculator may calculate the auditory saliency based on the audio characteristics for each sub frequency band.

Here, the auditory saliency weight may be predetermined or be calculated from the audio characteristics information.

Here, the tactile signal may be generated by converting a frequency of the received audio signal, or be generated as a reference vibration frequency corresponding to each sub frequency band in which a frequency band of the received audio signal is divided into the predetermine unit.

Further, the tactile signal may be generated as the reference vibration frequency by determining an amplitude according to the auditory saliency.

Here, the tactile signal generator may determine a pattern of a haptic stimulus based on the auditory saliency and a sound source configuring the received audio signal.

Here, the audio signal may be generated from an element of an operating system controlling an audio driver.

Here, the apparatus for generating the audio-based haptic signal may further include a haptic stimulus generator configured to receive the calculated tactile signal and generate a haptic stimulus.

In still other example embodiments, a method for generating a haptic signal with auditory saliency estimation from an audio signal, comprises detecting audio characteristic information of a bass component and audio characteristic information of a treble component from a received audio signal, estimating auditory saliency with respect to the audio signal based on the two types of audio characteristic information, and calculating a tactile signal based on the auditory saliency.

Here, each of the two types of audio characteristic information may include a total amplitude obtained by summing every component of each subband corresponding to the two types of audio characteristic information, a peak loudness obtained by estimating the audio signal of each subband as a predetermined scale, and a peak energy of the audio signal of each subband.

Here, the method may further include, before the estimating of the auditory saliency, performing normalization by applying a predetermined weight value to at least one among the total amplitude, the loudness, and the peak energy.

Here, each of the amplitudes of all components of each subband corresponding to the two types of audio characteristic information may have a value which is linearly multiplied or divided, and the peak energy may be estimated based on Teager-Kaiser energy. The value which is linearly multiplied or divided may be a value within a range from 0 to 1.0.

Here, the method may further include, before the detecting of the two types of audio characteristic information, dividing a frequency band of the received audio signal into two sub frequency bands, and generating the audio signal for each sub frequency band.

Here, the generating of the tactile signal may include calculating a peak pitch in the auditory saliency for each subband of the two types of audio characteristic information, calculating a perceptual magnitude of vibration of each subband in the peak pitch, and converting the perceptual magnitude into a physical vibration amplitude.

Here, the vibration amplitude may include perceptual characteristics of superimposed dual frequency vibration emphasizing a bass component and an attenuating treble component of the two types of audio characteristic information, and may be converted into voltage command amplitudes through I/O mapping of a vibration actuator.

Here, the perceptual magnitude of the vibration may include spectral components of each of a subband of a treble component and a subband of a bass component which are played in the vibration actuator at the same time.

Here, the method may further include, after the generating of the tactile signal, selecting a designed intensity or mode (operational mode) of a haptic stimulus by the tactile signal or the perceptual magnitude of the vibration.

BRIEF DESCRIPTION OF DRAWINGS

Example embodiments of the inventive concept will become more apparent by describing in detail example embodiments of the inventive concept with reference to the accompanying drawings, in which.

DESCRIPTION OF EXAMPLE EMBODIMENTS

Figure 1:
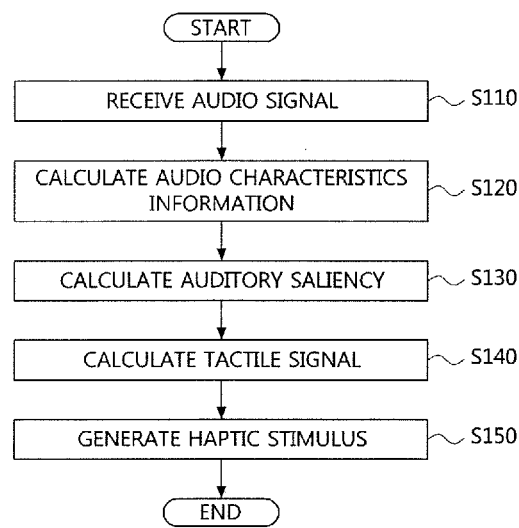
FIG. 1 is a flowchart for describing a method of generating a haptic signal with auditory saliency estimation from an audio signal according to an embodiment of the inventive concept.

First, the terminology used herein will be described briefly.

A haptic signal may be a signal capable of transmitting information to a user by being manipulated so that a user senses vibrations, motions, forces, etc. while manipulating various kinds of game consoles or an input device of a computer such as a joystick, a keyboard, a touch screen, etc. The signal may generally be digitized data, but in a broad meaning, include haptic stimuli itself. For example, a low frequency wave itself vibrating with a constant frequency which is equal to or less than 1 KHz may be included in the haptic signal. The haptic stimuli may be vibrations, the motions, the forces, etc. transmitted to the user using haptic technology.

A rhythm may be a tempo, and may be referred to as succession of a sound according to a regular rule, that is, the rhythm may mean that the sound continuously proceeds while changing lengths of notes and commas.

A melody may be tune or line. The melody may be one of three factors of music (rhythm, melody, harmony), be a factor which very well represents a musical expression and a human emotion may be a linear succession of a sound of horizontally combining and forming the sound having various pitches and lengths. When the harmony is a simultaneous (vertical) combination of a plurality of sounds, the melody may be sequential (horizontal) and single sound arrangements of sounds having different pitches. However, the succession of the sound should include a temporal order, that is, the rhythm, so as to have a musical meaning. Accordingly, the melody may be a form of a sound motion generated by combining a line and a rhythm of the pitch.

Meanwhile, three factors of the sound may be a loudness of a sound, a pitch of a sound, a timbre. The loudness of the sound may be defined by an amplitude of a sound wave, and its unit may be a decibel as a physical amount and a phon as a emotional amount. The pitch of the sound may be defined by a frequency per a second of the sound wave. The timbre may be defined by a difference of a waveform according to a ratio of a high frequency component of the sound, and this is why sounds of a piano and a violin are different even when their loudness and pitches are equal.

In detail, the loudness of the sound may include a directivity concept. The loudness of the sound in any direction at any point may be defined as an average ratio of energies of the sound transmitted through a surface of a unit in a direction orthogonal to a desired direction. The unit may be $S/m^2$. The loudness of the sound in a direction a specified in a sound field may be a sound energy flux passing through the surface of the unit in a direction orthogonal to the direction, and be defined as follows.

$$I_a = \frac{1}{T} \int_0^T p v_a dt \qquad \text{[Equation 1]}$$

T: a time which is an integer multiple of a period or is enough long compared with the period
p: a transient value of a sound pressure
$v_a$: a particle speed in a direction "a"

An energy having the sound may be an energy generated by a pressure change of air. An eardrum may be vibrated by the energy, the force of the sound may be felt according to an amplitude of the vibration (a size of an amplitude). The force of the sound may be a size of the energy in which the sound has and may be measured physically, and the size of the sound may be an emotional size and may not be measured physically.

The pitch may be a height of the sound. The pitch may mean a difference between frequencies of the sound, a high sound may be sensed when the frequency is high, and a low sound may be sensed when the frequency is low. Since the pitch is due to a difference between frequencies, the sound having a high frequency may be sensed to be high and the sound having a low frequency may be sensed to be low. Therefore, a problem of the pitch may need to consider two viewpoints of a physical viewpoint related to the frequency and a psychological viewpoint related to the sound.

The pitch may be represented by using a sound name in music, and the frequency per one second of a La3 (A4) sound was determined to tune as 440 Hz at a Stuttgart meeting in 1834, and the pitch was adopted at London meeting in 1939. The pitch represented by the sound name may be a relative pitch based on any sound, and may be calculated based on the La3 (A4) sound which is the sound of 440 Hz. That is, the pitch of the La3 (A4) sound may be the height of a sound wave having the frequency of 440 Hz, and in a western standard scale, a tuning reference rate of adjacent semitones may be determined by multiplying the frequency of the La3 (A4) sound by $2^{1/12}$ (about 1.059).

The pitch may be represented by a spectrum, and a frequency spectrum may be a method of representing components of a wave such as a light wave, an electric wave, a sound wave, etc. A sound wave generated by combining with the component having a different frequency may be a complex sound, and for example, a sound of an instrument which is regularly heard may be a sound in which components having different frequencies or intensities are overlapped.

The frequency spectrum may represent characteristics of a waveform or a result of a Fourier transform as a function of the frequency, and represent a height of the line (a vertical axis) representing an amplitude of a harmonized sound on a horizontal axis representing the frequency.

A frequency transform may be an operation of transforming to different frequencies of a sum and a difference (f1±f2) by mixing different two frequencies f1 and f2, and a middle frequency of a superheterodyne receiver may be a representative example of the frequency transform. The frequency transform of transforming into the sum frequency may be an upper transform, and the frequency transform of transforming into the difference frequency may be a lower transform.

A sound source may be a source generating a sound. Sound sources may be classified as a point sound source, a line sound source, a surface sound source. The point sound source may have a low sound source compared with a receiving distance and be a case in which the sound is emitted from the sound source on a surface of a sphere, and the linear sound source may be a sound source in which a number of the point sound sources are connected in a line form. The surface sound source may be a high quality sound source in which the sound is emitted from a wide surface.

The sound wave may be spherically widen from the point sound source, and since the energy is decreased according to expansion of a surface area of the sphere, a sound pressure level (SPL) at a location in which a distance from the sound source is γ[m] may be expressed by SPL=PWL-11-20 log 10γ[dB] when representing an output of the sound source as a power level (PWL). The law may be an inverse square law with respect to distance attenuation in the point sound source. That is, whenever the distance becomes double, the pressure level may be attenuated by 6 dB. This law may be satisfied with respect to one direction when there is directivity of the sound even when it is not the point sound source. This law may be used when calculating a sound field in order to reduce noise.

An audio driver may be a device driver of controlling an application program needed when playing and recording the sound in an operating system such as a window system or a Linux system. The audio driver may include or manage a compressor and decoder driver, a format converter driver, and a filter driver. An audio command and data transmitted using a media control interface (MCI) may be transmitted to the audio driver, and drive a sound card, etc. installed in the system.

The operating system may be basic software of providing an environment in which the application program is effectively executed by loading a kernel to a main memory device simultaneously when the computer is started and by operating the computer and managing an operation.

An initial operating system may monitor and control so that a central processing unit (CPU), a main memory device, a disk device, various input and output devices, etc. are normally operated, and basically, have a system management function of allocating and distributing hardware resources such as a CPU time, a memory area, an input and output, etc. in which the application program uses, but a current operating system may further include utility functions so that various kinds of application programs for a video, or a game are performed, and a user interface may be changed to a graphic user interface (GUI) which is more convenient.

A system management function such as a file management of managing a subsidiary storage device such as a hard disk, an execution sequence of an application program, a task management and a job management of managing priority, etc., a security management for identifying and confirming a user, a communication network management of managing information exchange between computers may be performed behind the user's eye.

There may be a Microsoft disk operating system (MS-DOS) and Windows of Microsoft Co., OS/2 of IBM Co., Mac OS of Apple Inc. in representative OSs used in the personal computer (PC), and there may be a UNIX, Linux developed by an AT&T Inc. in a workstation.

Hereinafter, a configuration of the present invention will be described in brief before describing embodiments of the present invention with reference to the accompanying drawings.

An extent in which a man pays attention acoustically may be calculated by selectively combining an intensity, a pitch, an energy which are primarily extractable from an audio signal, and physical and cognitive characteristics factors such as a temporal change of the intensity and the pitch. A tactile signal in consideration of the calculated auditory saliency for each time or of entire signal may be generated, and the generated tactile signal may be physically transmitted to the user through a tactile display. There may not be one predetermined method in a method of calculating the auditory saliency, and kinds of characteristics factors which are combined and a combination calculation equation may be changed, but there may be a common purpose for representing a distinct degree of auditory stimuli in which a man actually senses.

An analysis of the audio signal may be performed by calculating the extent in which the man pays attention acoustically and generating the tactile signal in consideration of the extent. The audio signal may be a digital or analog signal, and be divided into two or more sub frequency bands. Accordingly, the tactile signal may be also divided into two or more sub frequency bands so as to generate haptic effects. Further, the tactile signal may be generated as two or more haptic stimulus patterns.

Moreover, the haptic stimulus may be transferred using two or more haptic displays. The haptic display may be a unit capable of generating one multi-frequency. The frequency band of the audio signal may be converted into a low frequency in which a man senses by a touch. A function of generating the haptic signal may be implemented as an element of the operating system (OS), and a corresponding function may be implemented in an accessory form.

Figure 2:
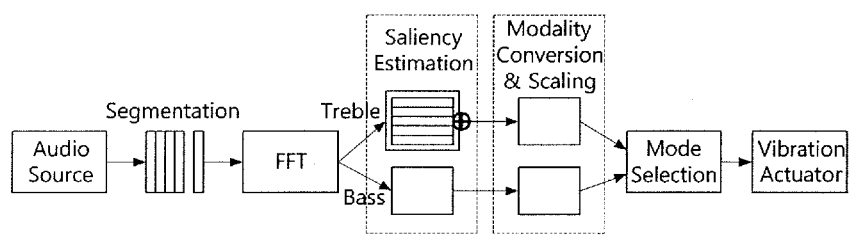
FIG. 2 is an exemplified diagram for describing an implementing process of generating a haptic signal from an audio signal according to an embodiment of the inventive concept.

FIG. 1 is a flowchart for describing a method of generating a haptic signal with auditory saliency estimation from an audio signal according to an embodiment of the inventive concept, and FIG. 2 is an exemplified diagram for describing an implementing process of generating a haptic signal from an audio signal. The method of generating an audio-based haptic signal and the detailed operations thereof will be described below with reference to FIGS. 1 and 2.

The method of generating the audio-based haptic signal, in a method of generating the haptic signal from an audio signal, may include calculating (S120) audio characteristics information from a received audio signal (S110), calculating auditory saliency according to the audio characteristics information based on an auditory saliency weight (S130), and calculating a tactile signal based on the auditory saliency (S140).

The audio characteristics information may include at least one among an intensity, a pitch, a rhythm, an energy, a temporal contrast, a melody, a harmony, and a timbre, of the received audio signal.

The calculating of the audio characteristics information (S120) may divide a frequency band of the received audio signal into a predetermined unit and calculate the audio characteristics information for each sub frequency band, and the calculating of the auditory saliency (S130) may calculate the auditory saliency based on audio characteristics information for each sub frequency band.

The auditory saliency weight may be predetermined, or be calculated from the audio characteristics information. The tactile signal may be generated by converting the frequency of the received audio signal, or be generated as a reference vibration frequency corresponding to each sub frequency band dividing the received audio signal into the predetermined unit.

Further, the tactile signal may be generated as the reference vibration frequency by determining an amplitude according to the auditory saliency. The calculating of the tactile signal (S140) may determine a pattern of a haptic stimulus based on the auditory saliency and the sound source configuring the received audio signal.

The method of generating the haptic signal proposing in the present invention may include the following operations when describing as an example with reference to FIG. 2. The physical and cognitive characteristics factors of the audio may be calculated from the received audio source. At this time, the audio source may be calculated by segmenting for each sound source, each frequency band.

The calculating of the auditory saliency from the characteristics factors of the audio may calculate the auditory saliency for each sub frequency band such as treble, bass, etc. with respect to the audio signal converted into a frequency domain using a fast Fourier transform (FFT). The calculating of the tactile signal from the auditory saliency of the audio may calculate by performing a modality conversion operation of converting the audio signal which is a relative high frequency signal into the tactile signal which is a low frequency signal, or by performing a scaling operation of scaling into the tactile signal corresponding to each sub frequency band. When calculating the tactile signal through the operations, the haptic stimulus may be generated by outputting the calculated tactile signal to a haptic stimulus generation device.

The audio signal may have various forms such as a sound wave in a natural state, an electric wave in a frequency modulated state, a bit stream stored in a data form by being quantized and digitized, etc. This may mean that the audio signal of the present invention is not limited to its form.

Referring to FIG. 1, the calculating of the physical, cognitive characteristics factor of the audio may use a method of calculating various factors such as an intensity, a pitch, a speed, an energy, a roughness, a softness, a harmony, a brightness, etc., which is previously well known. Further, there may be various calculation methods with respect to one factor. Accordingly, the calculating of the characteristics factor of the audio may be implemented by hardware and software according to a well-known method, and the physical, cognitive characteristics factors of the audio may be calculated for each sub frequency band by dividing an audible frequency band into a plurality of sub frequency bands in order to consider different characteristics of various sound sources (instruments, voices, effect sounds, etc.) included in the audio signal in more detail.

The calculating of the auditory saliency from the characteristics factors of the calculated audio may use the factors such as the intensity, the temporal contrast, the frequency, and calculate the auditory saliency for each sub frequency band when the audio characteristics factors for each sub frequency band are calculated in the calculating of the audio characteristics information or calculate the auditory saliency for each of sub frequency bands having the smaller number or the auditory saliency of entire frequency band.

Further, the auditory saliency weight may be considered to calculate the auditory saliency. The auditory saliency weight may consider a fact that the auditory characteristics paying attention to the sound is different according to the man and characteristics of the sound itself. The auditory saliency weight may be predetermined, and be determined by a physical factor.

A filter may be used for the physical factor, and the filter may be a sound filter. The filter may obtain a sound wave of a specific wavelength region according to a spectrum of an input sound wave, and attenuate the intensity of the input sound wave.

Since the filter cuts an unnecessary portion according to the predetermined frequency, it may be possible to configure as a low cut filter cutting a low frequency band, a high cut filter cutting a high frequency band, and a band pass filter cutting only a specific frequency and passing through a remaining portion at it is. Further, it may be possible to configure as a band reject filter selecting and cutting only a specific frequency, and use by combining the filters.

The calculating of the tactile signal transmitting to the touch display using the calculated auditory saliency may determine various characteristics and patterns physically, cognitively such as the intensity, the frequency, and the roughness, etc. of the tactile signal based on the saliency of the audio signal. Since the frequency band of a sense of touch in which a man senses is very narrow, a vibration signal may be generated by being converted the frequency band of the audio signal into a low vibration frequency band which is equal to or less than 1 KHz. Further, the haptic signal may be generated by converting the amplitude, frequency of the reference vibration frequency according to the auditory saliency by corresponding to a reference vibration frequency which is equal to or less than 1 KHz for each sub frequency one by one. Since there is a model which is partly known with respect to a relation between the physical characteristics and cognitive characteristics of the tactile signal, a more effective touch may be generated and transferred cognitively by also considering the characteristics of the touch display.

Since the technology is possible to perform an operation in real time, the technology may be used when automatically generating the haptic signal by installing in a mobile device, a game terminal, a home theater, a 4D theater system, etc. and analyzing the audio signal of multimedia contents.

Figure 3:
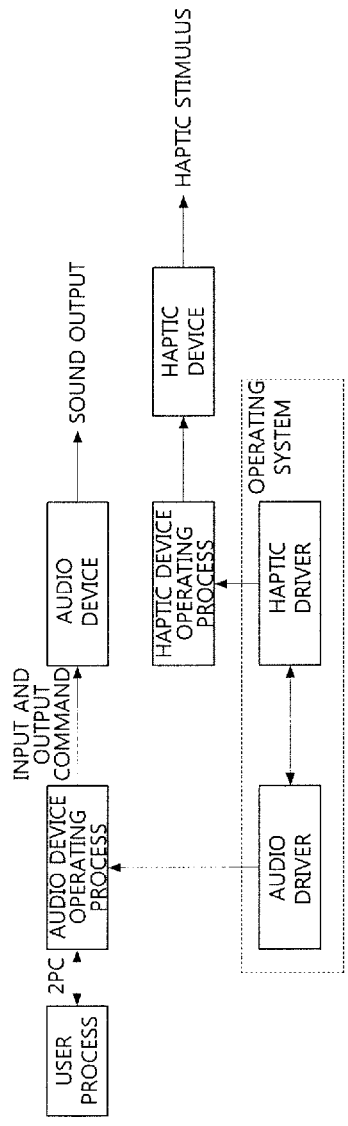
FIG. 3 is an exemplified diagram for describing implementation of a method of generating a haptic signal with auditory saliency estimation from an audio signal according to an embodiment of the inventive concept.

FIG. 3 is an exemplified diagram for describing implementation of a function of generating an audio-based haptic signal as elements of an operating system according to an embodiment of the inventive concept.

Referring to FIG. 1 continuously together with FIG. 3, the audio signal may be generated from elements of the OS controlling the audio driver. Further, the method of generating the audio-based haptic signal may further include generating a haptic stimulus by transmitting the tactile signal to a device generating the haptic stimulus (S150), after the calculating of the tactile signal (S140).

When implementing a corresponding function in an audio subsystem of the OS, the technology may also be applied to any kind of a game or movie music operating on a corresponding OS. Further, when implementing in an accessory form of any apparatus, it may be possible to implement by applying the technology after receiving audio output and converting the received audio output into a digital signal. Moreover, a convenient function capable of minutely controlling touch effects according to tastes of a user and characteristics of contents which is used may be further provided.

Figure 4:
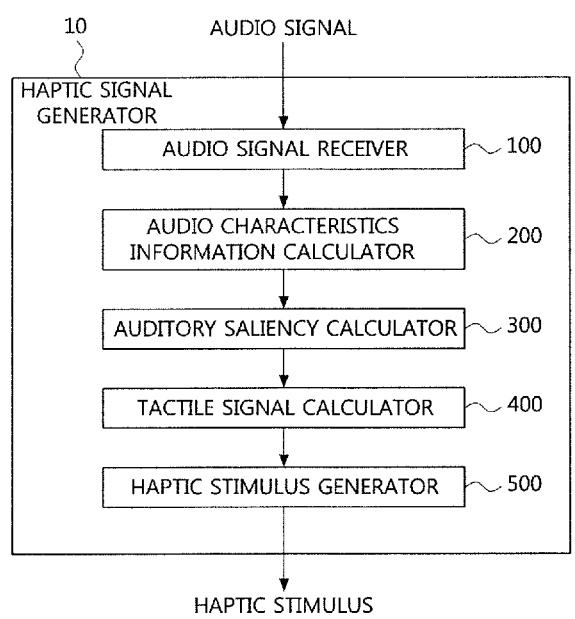
FIG. 4 is a block diagram illustrating an apparatus for generating a haptic signal with auditory saliency estimation from an audio signal according to an embodiment of the inventive concept.

FIG. 4 is a block diagram for describing an apparatus for generating an audio-based haptic signal 10 and elements thereof according to an embodiment of the inventive concept.

Referring to FIG. 4, an apparatus for generating an audio-based haptic signal 10 and elements thereof will be described below.

The apparatus for generating the audio-based haptic signal 10, in an apparatus of generating a haptic signal from an audio signal, may include an audio signal receiver 100 receiving the audio signal, an audio characteristics information calculator 200 calculating audio characteristics information from the received audio signal, an auditory saliency calculator 300 calculating auditory saliency according to the audio characteristics information based on an auditory saliency weight, and a tactile signal calculator 400 calculating a tactile signal based on the auditory saliency.

The audio characteristics information may include at least one among an intensity, a pitch, a rhythm, an energy, a temporal contrast, a melody, a harmony, and a timbre, of the received audio signal. The audio characteristics information calculator 200 may divide a frequency band of the received audio signal into a predetermined unit and calculate the audio characteristics information for each sub frequency band.

The auditory saliency calculator 300 may calculate the auditory saliency based on audio characteristics information for each sub frequency band, and the auditory saliency weight may be predetermined, or be calculated from the audio characteristics information.

The tactile signal may be generated by converting the frequency of the received audio signal, or be generated as a reference vibration frequency corresponding to each sub frequency band dividing the received audio signal into the predetermined unit. Further, the tactile signal may be generated as the reference vibration frequency by determining an amplitude according to the auditory saliency.

The tactile signal calculator 400 may determine a pattern of a haptic stimulus based on the auditory saliency and the sound source configuring the received audio signal. The audio signal may be generated from an element of the OS controlling an audio driver. The apparatus for generating the audio-based haptic signal 10 may further include a haptic stimulus generator 500 receiving the calculated tactile signal and generating the haptic stimulus.

Since the apparatus for generating the audio-based haptic signal 10 and the detailed elements thereof were described above in the method for generating the audio-based haptic signal, a duplicate description will be omitted. The apparatus for generating the audio-based haptic signal 10 and the elements thereof may be logically separable elements, and it may not mean that their physical locations are different. For example, each element of the apparatus for generating the audio-based haptic signal 10 may actually be configured in the same physical location.

An example of a haptic music player implemented by applying the method of generating the haptic signal according to an embodiment described above will be described hereinafter.

An embodiment of the inventive concept improving performance of a haptic music player using auditory saliency estimation will be described. In an embodiment of the inventive concept, the auditory saliency may mean an extent to which a sound attracts a listener's attention. The auditory saliency estimation may emphasize only salient parts of music by vibration feedback, and lead to a further enhanced music listening experience. Other notable improvements may include an extension to multiband vibrotactile rendering using a wideband actuator in order to transmit more information in music and revise perceptual intensity models used in audio-to-vibration modality conversion. The perceptual advantages to of the new saliency-based haptic music rendering algorithm may be assessed by a user study related to different music genres.

Structure

Referring to FIG. 2 again, the haptic music player using the method of generating a haptic signal with the auditory saliency estimation may be implemented as the apparatus for generating the haptic signal, and the overall calculation process will be described.

First, a music source file may be read and be stored in a timed sequence. Each element may represent a sound amplitude.

Next, an amplitude sequence may be partitioned into short segments with the same length (Segmentation). Then, a fast Fourier transform (FFT) may be applied to calculate a spectral magnitude density of each segment. The spectral density from 25 to 6400 Hz may be divided into six subbands, and each subband may be denoted by one bass band (≤200 Hz) and five treble bands (>200 Hz, one octave each).

Next, from the spectral density in each subband, three auditory characteristics for the saliency estimation may be calculated. Then, an auditory saliency score for each subband may be derived, and the derived auditory saliency may be scaled using a haptic equalizer (Modality Conversion & Scaling).

Next, a perceptual intensity scaling may follow to convert the saliency scores into voltage commands for a vibration actuator (Vibration Actuator). A designed operational mode of the vibration actuator may be selected (Mode Selection).

The overall conversion process may be summarized as follows:

Auditory saliency→vibratory perceived magnitude→physical vibration amplitude→voltage amplitude to the actuator.

Hereinafter, some important steps in the overall conversion process will be described in more detail.

Auditory Saliency Estimation

The purpose of using the auditory saliency estimation may be to emphasize only the salient characteristics in music rather than a faithful transcription of entire music content. The faithful transcription of the entire music content may be the main intention of a conventional haptic music player. That is, there may be a problem in that most conventional haptic music players produce continuous and strong vibrations which can lead to diminished interest and increased fatigue in users. Particularly, previous studies on the auditory saliency estimation have not been able to find an auditory saliency model targeted to music.

In the haptic music player, three characteristics may be selected in each subband for the real-time auditory saliency estimation: a total amplitude (A), loudness at a peak frequency (L) in the power spectrum, and an energy at the peak frequency (E). Two physical characteristics (A and E) may be effectively used for detecting salient events in speech. A perceptual linear advantage may be useful for audio-to-tactile conversion, and may be included as perceptual characteristics (L). A method of calculating the three characteristics for each subband will be described as follows:

Total amplitude (A): the total amplitude (A) may be calculated by adding amplitude of every component of each subband. The amplitude of every component may have a value within a range from 0 to 1.0. A range of the amplitude may be an example of a value which is linearly multiplied or divided, but is not limited thereto, and it may be desirable to apply the range of the amplitude in view of efficiency and performance. The value of total amplitude (A) may be great when the music is homophonic or polyphonic in an octave band, and may be small when the music is monophonic. The use of the value may approximate the spectral summation in auditory perception.

Peak loudness (L): a peak loudness (L) representing a perceptual loudness of an audio signal may be estimated in a decibel (dB) scale using an ISO 226 equal-loudness contour. A 16-bit PCM audio file may include intensity data in a range of 90 dB. Considering a normal audio volume, the calculated loudness level may be adjusted using a ramp function with an offset of −30 dB. Then, the result may be normalized into a value from 0 to 1.0. When the music signal has a high amplitude peak close to 3 kHz which is the most sensitivity frequency, a great loudness (L) may be observed.

Peak energy (E): the peak energy may be estimated by Teager-Kaiser energy.

That is, the peak energy (E) may be estimated as follows:

$$E = a^2 \sin^2 \omega. \qquad \text{[Equation 2]}$$

Here "a" is a spectral magnitude of each component, and ω is an angular frequency of each component.

Since the peak energy E is drastically changed over time, log E (≤0) may be used, and may be normalized to the value from 0 to 1.0 using a ramp function with an offset of 6.0 for a stable operation. Further, a large log E may he observed with an intense high frequency sound.

Using the above three factors, the auditory saliency for the i-th subband (assuming that i=1: the lowest frequency band, i=6: the highest frequency band) at the n-th loop, $S_i(n)$, may be estimated as follows:

$$S_i(n) = A_i(n) \cdot L_i(n) \cdot \log E_i(n) \qquad \text{[Equation 3]}$$

The multiplication equation of Equation 3 may require high values of all factors for a high saliency score. The form may emphasize only the salient parts in music without generating excessive vibrations.

Another saliency estimation function may be implemented to have smoother temporal variations using a weight value other than the function of Equation 3, which showed the best perceptual performance in pilot tests. The weight value may be applied when normalizing each type of audio characteristic information. The weight value may be applied using a predetermined look-up table for each music genre and each subband as shown in the following table 1, but is not limited thereto. The weight value may be separately or individually set according to a type of a haptic apparatus, a predetermined music clip, a predetermined video clip, etc., and weight information including the weight values desired to be applied according to implementation may be implemented to be received in real time through a network.

Hereinafter, modality conversion and intensity scaling processes will be described.

An embodiment of the inventive concept may convert estimated saliency scores into vibrotactile intensities according to the number of vibration rendering bands (two or six).

Conversion to Perceptual Magnitudes of Vibrations

For example, a perceptual magnitude of vibration $I_i$, and a relative peak pitch $P_i$ may be calculated from the saliency scores $S_i$ of each of the six auditory subbands.

When listening to music, people generally anticipate and feel vibrations from bass components more than treble components. Accordingly, in an embodiment of the inventive concept, a peak pitch for reflecting this expectation by emphasizing the bass components and attenuating the treble components in an audio-vibration conversion process may be introduced. For example, the peak pitch may include a mel-scaled peak pitch. Since only the audio spectrum from 25 Hz to 6400 Hz is used for the peak pitch in an embodiment of the inventive concept, the relative peak pitch at the n-th loop may be calculated by the following Equation 4.

$$P(n) = \text{mel}(f_{peak}(n))/\text{mel}(6400 \text{ Hz}) \quad [\text{Equation 4}]$$

For a dual band mode, a perceptual magnitude of the vibration $I_{bass}(n)$ in the bass component and a perceptual magnitude of the vibration $I_{treble}(n)$ in the treble component for each subband may be calculated by the following Equation 5 using the peak pitch P(n).

$$I_{bass}(n) = w_{bass} c S_1(n) P_1(n)^\beta,$$

$$I_{treble}(n) = w_{treble} c \sum_{i=2}^{6} S_i(n) P_i(n)^\beta \quad [\text{Equation 5}]$$

In Equation 5, c is a cross-modal scaling constant, and $W_{bass}$ and $W_{treble}$ are the gains of the bass and treble bands for haptic volume control. $\beta$ is a weight of saliency attenuation by the peak pitch.

According to an embodiment of the inventive concept, $-0.4 < \beta < 0$ may be adequate to reflect stronger bass vibrations and calm treble vibrations which appear in actual music.

For a multiband mode, the perceptual magnitude of the vibration h(n) in the bass component may be calculated by the following Equation 6.

$$I_i(n) = \omega_{treble} c S_i(n) P_i(n)^\beta \quad [\text{Equation 6}]$$

Mode Selection Rendering

In the dual band mode and the multiband mode of an embodiment of the inventive concept, perceptual characteristics of superimposed dual-frequency vibration may be utilized.

When the superimposed dual-frequency vibration is used, a rough and dissonant feeling of superimposed vibration may increase as the frequency ratio (f2/f1, f1<f2) decreases. When the bass component is dominant in the music, the superimposed dual-frequency vibration may be rendered to invoke a rough sensation. Otherwise, a simple high frequency vibration may be played to impart a smooth sensation.

Frequencies $F_1$ and $F_2$, and perceptual intensities $\Psi_1$ and $\Psi_2$ may be set to satisfy the following Equations 7 and 8.

$$\text{If } I_{bass}(n) > I_{treble}(n), \text{ then } \psi_1(n) = I_{bass}(n)/\sqrt{2} \quad [\text{Equation 7}]$$

$$\text{If } I_{bass}(n) < I_{treble}(n), \text{ then } \psi_1(n) = 0, \text{ and } \psi_2(n) = I_{treble}(n) \quad [\text{Equation 8}]$$

In the multiband mode, spectral components $f_i$ ($f_i < f_{i+1} = \{1, 2, \ldots, 6\}$) for each of the six subbands may be played at the same time. Their perceptual intensity $\psi_i$ may be set to $I_i$.

Of course, in the dual band mode, spectral components of each of the bass component and the treble component may be played at the same time instead of the six subbands. This may be a very simplified superimposed dual-frequency vibration compared with complex superimposed dual-frequency vibration of the multiband mode.

Conversion to Physical Amplitude

The perceptual magnitude of the vibrations $\psi_i(n)$ may be easily converted into a predetermined vibration amplitude at the frequency $f_i$ using a conventional perceptual magnitude function for vibration stimuli. Then the vibration amplitude may be converted into voltage command amplitudes using I/O mapping of the vibration actuator at each frequency.

Subjective performance of a saliency improvement algorithm was evaluated by comparing the dual band and multiband modes of an embodiment of the inventive concept as an experiment example and a conventional dual band mode (a comparison example), and this will be discussed below.

Evaluation Method

Thirty healthy university students (15 males and 15 females, 19-25 years old) participated as participants in this experiment. All participants were daily mobile phone users.

Haptuator Mark II (Tactile Labs, rated bandwidth: 90-1000 Hz), which is a vibration actuator, was used as an apparatus for the haptic music player. The Haptuator allows precise expressions enabled by a much faster time response (≈1 ms) than the conventional LRAs or DMA (50-100 ms) used in conventional studies. The actuator was attached to the wide frontal face of a handheld mockup made of an acrylic resin (110×60×10 mm). The vibration was transferred to the participants' hands in a lateral direction (a thumb-a little finger) of the participants' hands. An I/O relation of the actuator was implemented to be expanded at the center of the mockup using a miniature accelerometer (Kister; model 7894A500). A personal computer (PC) was implemented to control the actuator at a 10 kHz sampling rate via a data acquisition board (National Instruments; model USB-6251). An over-ear headphone was used for auditory playback.

The algorithm described above was implemented as audio file I/O (Audiere 1.9.4) and FFT (FFTW 3.2.2) using MS Visual C 2008 with external libraries. The algorithm was designed and implemented to maintain real-time performance together with the additional characteristics. A current prototype was implemented to operate on a PC (3 GHz Intel Corel Duo) because of difficulty of custom signal I/O processing on commercial mobile platforms. A length of a music segment processed in each loop was 50 ms.

As experimental conditions, the user study used 12 experimental conditions (3 rendering modesx4 music genres). Three modes for vibration rendering were used: the dual band mode (a conventional dual-DMA mode) of the comparison example, and two saliency improvement rendering modes, that is, the dual band mode (which may hereinafter be referred to as a saliency-dual mode) and the multiband mode (which may hereinafter be referred to as a saliency-multi mode) of an embodiment of the inventive concept. In the saliency-dual mode, superposition of 150 Hz and 200 Hz sinusoidal vibrations was used for the dual-band mode to express a feeling of the bass component. A decreased frequency ratio compared with the frequency ratio (150 Hz and 223 Hz) of the comparison example was applied to provide a rough sensation in the superimposed vibration. The saliency-dual mode may be referred to as mode processing by dividing the bass and the treble into two sounds. In the saliency-multi mode, six frequencies with a 25% step size ($f_{i+1}=1.25f_i$), which is larger than a difference threshold value (about 20%) of a vibration frequency in which the range is from 80 Hz to 244 Hz, were used. The saliency-multi mode may be referred to as a mode including ultra bass, baritone, alto, ultra treble, or a combination thereof in addition to bass and treble.

Four music genres and four pieces of music for each genre were selected. For each music genre, a 3-minute music clip made by concatenating each of the four pieces of music which were trimmed to 45 seconds was used. The predetermined weight value of the haptic equalizer was set to the values shown in the following Table 1. The perceptual intensity of vibration was adjusted to be similar to the three rendering conditions.

TABLE 1

| | Frequency (Hz) | | | | |
|---|---|---|---|---|---|
| | 200-400 | 400-800 | 800-1,600 | 1,600-3,200 | 3,200-6,400 |
| Rock | 0.25 | 0.15 | 0.12 | 0.18 | 0.30 |
| Dance | 0.25 | 0.15 | 0.15 | 0.20 | 0.25 |
| Classical | 0.25 | 0.20 | 0.15 | 0.15 | 0.25 |
| Vocal | 0.05 | 0.15 | 0.70 | 0.05 | 0.05 |

Prior to the experiment, instructions about the experimental procedures and explanations of the questionnaire were given to each participant. Then, the three vibration rendering modes were played sequentially in a 2-minute training session.

A main experiment consisted of four sessions. Each session used one among the 3-minute genre representative music clips. First, the participant listened to the music clip without vibrotactile playback to become familiar with the music and establish a perceptual reference. The participant could adjust an audio volume to a comfortable level. Then, the music clip was played with vibration in each of the two modes according to an embodiment of the inventive concept among the three rendering modes.

After each experiment, the participant wrote answers on the three rendering modes using the questionnaire sheets. The questionnaire sheets were prepared to collect four subjective measures in a 0-100 continuous scale. The four subjective measures were as follows.

Precision: "Did the vibration express the music precisely?" (0: very imprecise, 100: very precise)

Harmony: "Was the vibration harmonious with the music?" (0: very inharmonious, 100: very harmonious)

Fun: "Was the vibration fun?" (0: very boring, 100: very fun)

Preference: "Did you like the vibration?" (0: disliked very much, 100: liked very much).

Each performance measurement was performed in a method in which the participant marked a pair of meanings among four meanings on a position on a line labeled on both ends. The participant rested for a few minutes to prevent tactile adaptation before proceeding to the next rendering condition.

This procedure was repeated three times in different rendering conditions. In order to remove any possible order effects, the orders of the rendering conditions in each session and those of the music genres were randomly set. At the end of a session, the participant reported the preference (0-100) of vibrotactile feedback for each music genre on the labeled line. The experiment lasted about 1.5 hours.

Experimental Result

Figure 5:
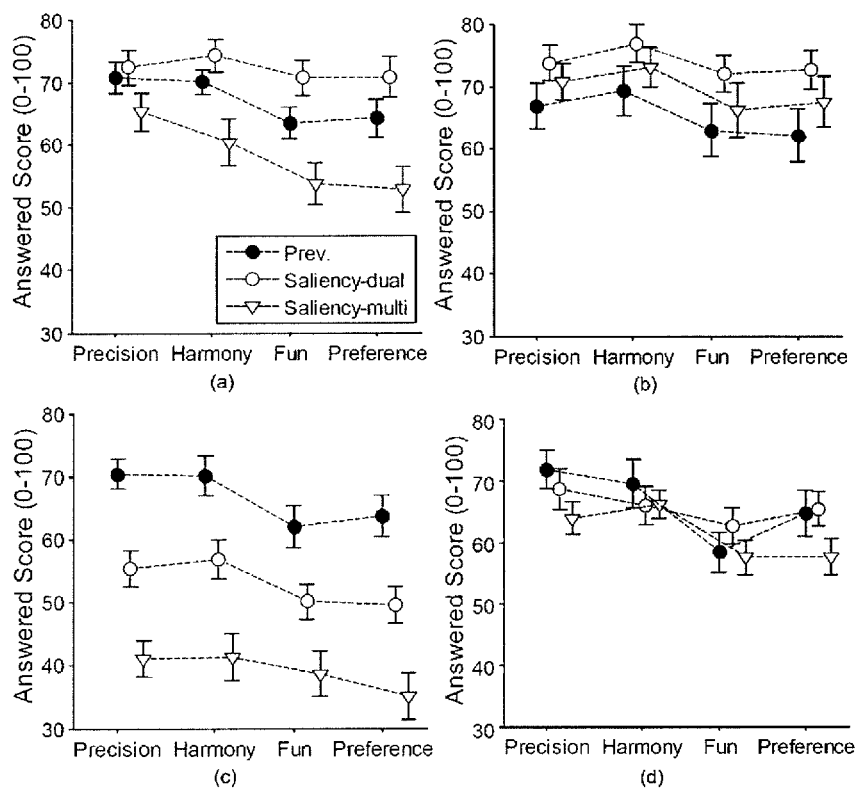
FIG. 5 is a diagram illustrating evaluation results of rendering conditions for music genres of the inventive concept and a comparison example.

An average score classified by music genres is represented by a standard error in FIG. 5. In FIG. 5, the four graphs represent measurement values for rock music, dance music, classical music, and vocal music in order from (a), (b), (c) and (d) of FIG. 5.

For each measurement value (precision, harmony, fun, preference) measured for each music genre, a repeated-measures ANOVA using Student-Neuman-Keuls post-hoc multiple comparison tests was performed. The three rendering modes, the four music genres, and their interactions were significant at all measurement values ($p<0.01$).

In rock music, the rendering mode of the comparison mode was insignificant in precision, harmony, fun, and preference (70.5, 69.2, 61.4, and 63.9). The saliency-multi mode scored lower than the comparison example. The saliency-dual mode scored excellently compared with the comparison example in every measurement. That is, in rock music, the preference of the participants with respect to the vibrotactile playback of the saliency-dual mode, at about 73.8 points, had a value over 10 points higher than the 63.6 points of the preference of the comparison example.

In dance music, the saliency-dual mode scored excellently compared with the saliency-multi mode and the rendering mode of the comparison example in all measurements. The rendering mode of the comparison example scored the lowest in all measurements. The participants preferred the vibrotactile playback of the saliency-dual mode and the saliency-multi mode in dance music compared with the comparison example.

Meanwhile, in classical music, the rendering mode of the comparison example clearly showed an advantage. In all measurement values, the rendering mode of the comparison example represented significant factors ($F(2, 58)=1.71, 1.86, 1.61,$ and $2.20$, respectively, $p>0.1$), and the three modes resulted in significant differences: the comparison example (Prev.)>the saliency-dual>the saliency-multi ($p<0.05$). Participants' preferences with respect to the mode for the vibrotactile playback were the lowest in classical music among the four music genres. The saliency-dual mode in classical music was at a middle level at about 48.7 points.

In voice music or vocal music, the three modes scored similarly in all measurements, and showed marginal significance in the precision ($F(2, 58)=2.68, p=0.08$). For the precision, the difference between the comparison example and the saliency-multi mode was significant ($p<0.05$). In the vocal music, participants' preferences using the vibrotactile playback, that is, the auditory saliency, were about 58.9 points, their preferences with respect to the saliency-dual mode were about 76.7 points, and their preferences with respect to the rendering mode of the comparison example were about 76.0.

The participants evaluated the saliency-dual mode for the vibrotactile playback according to an embodiment of the inventive concept as superior or equal to the comparison example in rock music and dance music, which are the most preferred music genres for vibrotactile playback. Further, the participants' common comments also reflected these results: "Saliency-dual shows good temporal contrast, which is fun, whereas the conventional technology is a little tiring due to continuous vibration."

It is expected that people will generally use the vibrotactile playback according to an embodiment of the inventive concept when listening to music with heavy beats such as rock or dance music. Thus, perceptual performance in music with heavy beats may be more important than that in classical music, which is the least preferred genre, and in this regard, the vibrotactile playback in the saliency-dual mode can improve a music listening experience over that of the conventional haptic music player.

In the evaluation, the saliency-multi mode showed the worst score among the three rendering modes. The participants commonly commented that the vibration was very rough in the multiband mode. In the saliency-dual mode, the rough sensation was generated to express drum beats or bass guitar sounds only when the bass sound was dominant in the music. However, in the saliency-multi mode, the superimposed vibration appeared when two or more subbands had strong saliency, regardless of the roughness of the music. In this experiment, the audio spectrum ranging from 25 to 6,400 Hz was converted into six vibration components in a narrow bandwidth (80-244 Hz). Thus, harmonious music chords tended to be expressed by the superimposed vibration which imparted rough and dissonant sensations. The saliency-multi mode may need to be complemented for vibrotactile playback.

Although several aspects have been described in a viewpoint of a method, it may be obvious that each of the aspects describes a corresponding apparatus, and here, the operation of the method may correspond to the element of the apparatus. According to specific implementation needs, the embodiments of the present invention may be implemented by hardware or software. The embodiments of the present invention may be executed by a computer program having a program code operating for one among the methods.

When using the method and apparatus for generating the audio-based haptic signal according to the present invention have an advantage in which the immersion, understanding, satisfaction with respect to the contents of the user are increased when appreciating the multimedia contents by emphasizing the portion paying attention in the audio signal on also the tactile signal and transmitting the tactile signal which is naturally harmonized with the auditory signal to the user.

In the environment in which it is difficult to transfer information using the hearing like a hearing-impaired person, a feeling of the audio signal may be transferred by the touch. On the other hand, when there is a portion which should be emphasized in the audio signal but has low saliency, intended information transmission can be smoothly performed by assisting the hearing by a method of emphasizing the portion by the touch.

The description may be merely an example of the scope of the invention, and one of ordinary skill in the art to which this invention belongs may make various changes, substitutions, and alterations without departing from the scope of the invention. Accordingly, there is no intent to limit the invention to the embodiments disclosed, and the scope of the invention is not limited to the embodiments. The scope of the invention may be interpreted by the following claims, and every technical spirit within its equivalent range may be interpreted as being included in the scope of the invention.

What is claimed is:

1. A method of generating a haptic signal with auditory saliency estimation from an audio signal, comprising:
   detecting audio characteristic information of a bass component and audio characteristic information of a treble component from a received audio signal;
   estimating auditory saliency with respect to the audio signal based on the two types of audio characteristic information; and
   calculating a tactile signal based on the auditory saliency,
   wherein the calculating the tactile signal includes calculating a peak pitch in the auditory saliency for each subband of the two types of audio characteristic information, calculating a perceptual magnitude of vibration of each subband in the peak pitch, and converting the perceptual magnitude into a physical vibration amplitude, and
   wherein the perceptual magnitude of vibration includes spectral components of each of a subband of a treble component and a subband of a bass component which are played in a vibration actuator at the same time.

2. The method of claim 1, wherein each of the two types of audio characteristic information includes a total amplitude obtained by summing every component of each subband corresponding to the two types of audio characteristic information, a peak loudness obtained by estimating the audio signal of each subband as a predetermined scale, and a peak energy of the audio signal of each subband.

3. The method of claim 2, further comprising, before the estimating of the auditory saliency, performing normalization by applying a predetermined weight value to at least one among the total amplitude, the peak loudness, and the peak energy.

4. The method of claim 1, wherein the estimating of the auditory saliency includes estimating the auditory saliency $S_i(n)$ based on the following Equation 3, $$S_i(n) = A_i(n) \cdot L_i(n) \cdot \log E_i(n) \qquad \text{[Equation 3]}$$

where n represents an arbitrary natural number, i represents an i-th subband among subbands of an n-th loop in which i=1 represents the lowest frequency band and i=2 or 6 represents the highest frequency band, $A_i(n)$ represents the total amplitude of the n-th loop, $L_i(n)$ represents a peak loudness in the n-th loop, and $E_i(n)$ represents a peak energy in the n-th loop.

5. The method of claim 4, wherein each of the amplitudes of all components of each subband corresponding to the two types of audio characteristic information has a value which is linearly multiplied or divided, and the peak energy is estimated based on Teager-Kaiser energy according to the following Equation 2, $$E = a^2 \sin^2 \omega \qquad \text{[Equation 2]}$$

where "a" represents a spectral magnitude, and w represents a frequency of each component.

6. The method of claim 1, further comprising, before the detecting of the two types of audio characteristic information, dividing a frequency band of the received audio signal into two sub frequency bands, and generating the audio signal for each sub frequency band.

7. The method of claim 1, wherein the vibration amplitude includes perceptual characteristics of superimposed dual frequency vibration emphasizing a bass component and an attenuating treble component of the two types of audio characteristic information, and is converted into voltage command amplitudes through I/O mapping of a vibration actuator.

8. The method of claim 1, further comprising, after the generating of the tactile signal, selecting a designed intensity or mode of a haptic stimulus by the tactile signal or the perceptual magnitude of the vibration.

9. An apparatus for generating a haptic signal with auditory saliency estimation from an audio signal, comprising:
- an audio signal receiver configured to receive an audio signal;
- an auditory characteristics information calculator configured to calculate audio characteristics information from the received audio signal;
- an auditory saliency calculator configured to calculate auditory saliency according to the audio characteristics information based on an auditory saliency weight; and
- a tactile signal calculator configured to calculate a tactile signal based on the auditory saliency,
- wherein the tactile signal calculator calculates a peak pitch In the auditory saliency for each subband of the two types of audio characteristic Information, calculates a perceptual magnitude of vibration of each subband in the peak pitch, and converts the perceptual magnitude into a physical vibration amplitude, and
- wherein the perceptual magnitude of vibration includes spectral components of each of a subband of a treble component and a subband of a bass component which are played in a vibration actuator at the same time.

10. The apparatus of claim 9, wherein the audio characteristics information includes at least one among an intensity, a pitch, a rhythm, an energy, a temporal contrast, a melody, a harmony, and a timbre, of the received audio signal.

11. The apparatus of claim 9, wherein the audio characteristics information calculator divides a frequency band of the received audio signal into a predetermined unit, and calculates the audio characteristics for each sub frequency band.

12. The apparatus of claim 11, wherein the auditory saliency calculator calculates the auditory saliency based on the audio characteristics for each sub frequency band.

13. The apparatus of claim 9, wherein the auditory saliency weight is predetermined or is calculated from the audio characteristics information.

14. The apparatus of claim 9, wherein the tactile signal is generated by converting a frequency of the received audio signal, or is generated as a reference vibration frequency corresponding to each sub frequency band in which a frequency band of the received audio signal is divided into the predetermine unit.

15. The apparatus of claim 14, wherein the tactile signal is generated as the reference vibration frequency by determining an amplitude according to the auditory saliency.

16. The apparatus of claim 9, wherein the tactile signal generator determines a pattern of a haptic stimulus based on the auditory saliency and a sound source configuring the received audio signal.

17. The apparatus of claim 9, wherein the audio signal is generated from an element of an operating system controlling an audio driver.

18. The apparatus of claim 9, further comprising:
- a haptic stimulus generator configured to receive the calculated tactile signal and generate a haptic stimulus.

* * * * *